March 14, 1933.　　A. A. WARNER　　1,901,853
VIBRATION DAMPER
Filed May 7, 1931

INVENTOR
Archibald A. Warner.
BY
ATTORNEYS.

Patented Mar. 14, 1933

1,901,853

UNITED STATES PATENT OFFICE

ARCHIBALD A. WARNER, OF DEARBORN, MICHIGAN

VIBRATION DAMPER

Application filed May 7, 1931. Serial No. 535,667.

The invention relates to motor vehicles and it has particular relation to an improvement in vibration dampers for eliminating vibrations occurring in the transmission shaft.

The primary objects of the invention are to provide improved means for eliminating vibrations occurring in the transmission shaft during its rotation; to provide an improved type of inertia member adjacent the universal joint for eliminating vibration in the shaft; to provide an improved means for eliminating vibration occurring in the shaft, which is operatively associated with a brake drum on the shaft; and to provide a yieldable connection between the brake drum and the inertia member.

For an understanding of the invention, reference may be had to the accompanying drawing forming a part of the specification in which.

Figure 1:
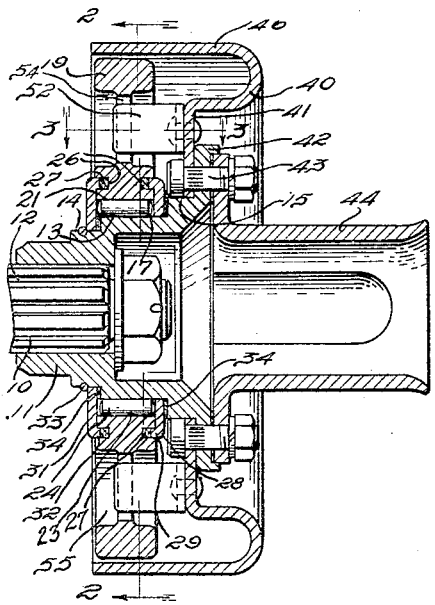
Fig. 1 is a fragmentary, longitudinal cross-sectional view of a transmission shaft in which the principles of one form of the invention are incorporated.
Figure 2:
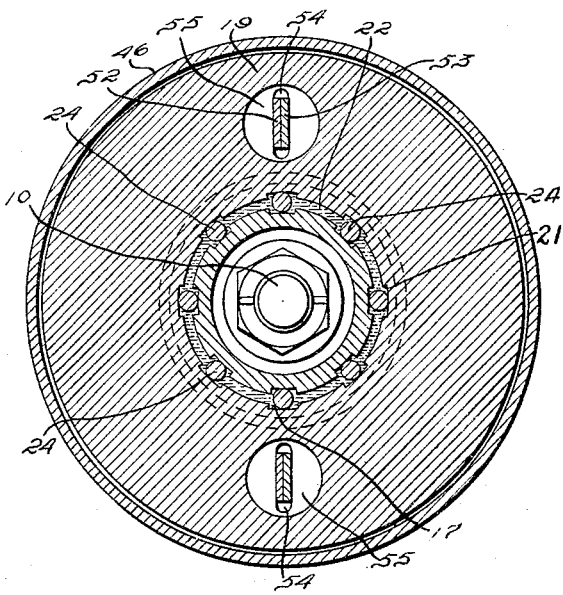
Fig. 2 is a cross sectional view taken substantially along the line 2—2 of Fig. 1.

Referring to Fig. 1, a driving shaft 10 is provided which is splined to a hub member 11 as indicated at 12. The hub member is provided with a bearing surface 13 of cylindrical shape, and annular shoulders 14 and 15 at opposite ends of the surface 13. As best shown by Fig. 2 the surface 13 is provided with circumferentially spaced, axially extending channel shaped slots 17. An inertia member 19 is mounted on the bearing surface 13 of the hub member, but its inner periphery is of such diameter that a substantial space exists between it and the bearing surface. Similarly to the bearing surface 13, the inner periphery of the inertia member 19 is provided with circumferentially spaced axially extending channel shaped slots 21 which normally are radially aligned with the slots 17. Rollers 23 are disposed in the enlarged space between the members provided by the slots 17 and 21, and substantially contact with the bases of both of the slots 17 and 21 to provide a metallic bearing contact between the members. A lubricant 22, such as heavy oil or grease, is disposed in the space between the members 11 and 19 and is sealed against escape by means which presently will be described. This lubricant serves to lubricate the rollers 23 and surfaces with which it contacts and ordinarily need never be replaced during the use of the damper.

Adjacent its inner portion, and on the sides thereof, the inertia member is provided with annular grooves 26 in which a sealing material 27 is provided. An annular ring 28 disposed between the inertia member and the annular shoulder 15 on the hub member, is employed for closing one end of the space between the inertia member and the hub member, and has an offset portion 29 projecting into the groove 26 and engaging the sealing material 27. A second annular ring 31 mounted on the annular shoulder 14 of the hub member is employed for closing the open end of the space between the inertia member and the hub member and similarly is provided with an offset portion 32 which projects into and engages the sealing material 27 in the groove at the opposite end of the inertia member. This ring is maintained in axial position on the annular shoulder 14 of the hub member by means of a round wire ring 33 disposed in a groove in the shoulder. For further sealing the space between the hub member and the inertia member, packing 34 is disposed between the annular ring 28 and the shoulder 15 of the hub member, and between the annular ring 31, and the end of the bearing surface 13.

A brake drum 40 having a radial portion 41 is mounted on the annular shoulder 15 of the hub member and is secured to a radial flange 42 on the hub member by means of bolts 43 projecting through the brake drum and flange. These bolts are also employed for securing a universal connection member 44 to the radial flange 42. The brake drum extends radially in an outward direction beyond the outer periphery of the inertia member 14 and is provided with an axially directed portion 46 which extends over the outer periphery of the inertia member in substantial spaced relation with respect thereto.

Figure 3:
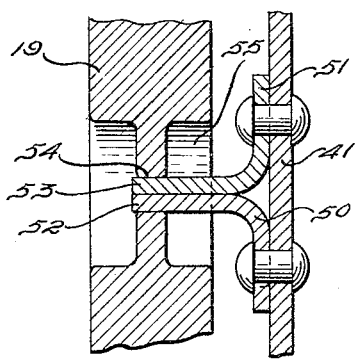
Fig. 3 is a detail view taken on a larger scale showing the resilient connection between the brake drum and inertia member shown by Fig. 1.

As best shown by Fig. 3, angle plates 50 and 51 disposed oppositely to each other are riveted to the radial portion of the brake drum, and have free end portions 52 and 53 contacting with each other and extending toward the inertia member 19. As best shown by Figs. 1 and 2, the brake drum is provided with angle plates of this character in diametrically spaced relation, although it is apparent that one or more than two sets of angle plates may be provided as found most desirable. The portions 52 and 53 of each pair of angle plates extend into and snugly fit in an opening 54 provided in the inertia member. The opening 54 is substantially enlarged on each side of the inertia member to provide a space 55 which is particularly adapted to permit a flexing movement of the portions 52 and 53 of the angle plates with respect to the inertia member, which may occur upon rotating the brake drum 40 with respect to the inertia member. This relation, of course, provides a resilient spring-like connection between the brake drum and the inertia member.

Figure 4:
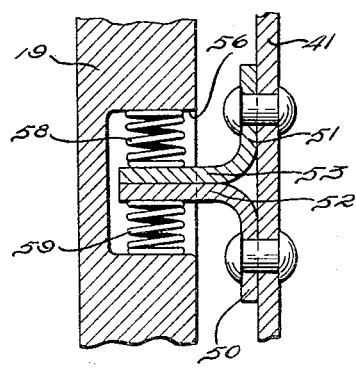
Fig. 4 is a view similar to that shown by Fig. 3 illustrating a modified form of connection.

Fig. 4 illustrates a modified form of connection of the character shown by Fig. 3 in which the portions 52 and 53 of the angle plates 50 and 51 respectively project into a substantially larger opening 56 in the inertia member 19. Helical springs 58 and 59, disposed at opposite sides of the portions 52 and 53 respectively, provide an additional yielding connection between the angle plates and the inertia member.

From the above description, it is apparent that when the shaft 10 and hub member 11 are rotated, the inertia member 19 likewise is rotated because of the yielding connection between the inertia member and the brake member 40. It will be apparent that the inertia member tends to rotate at a constant speed, and since it is connected to the transmission shaft by means of a yieldable connection, it yieldably retards changes in the rotary speed of the shaft. This arrangement of parts will effectively eliminate vibration in the shaft. Furthermore, it is apparent that should the inertia member rotate with respect to the hub member more than a predetermined amount, the enlarged portion 24 of the rollers 23 will engage diagonally opposed corners of the slots 17 and 21 and therefore positively limit such relative rotation.

The provision of a lubricant in the space between the inertia member and the hub is advantageous because it insures a free rolling movement of the rollers in this space and since the lubricant is sealed against escape, it need never be replaced during the use of the damper.

Although only certain forms of the invention have been illustrated and described in detail it will be apparent to anyone skilled in the art that many modifications may be made without departing from the scope of the appended claims.

I claim:

1. A vibration damper comprising a driven hub member, an inertia member rotatably mounted on and in concentric relation to the hub member, a disc member secured to the hub member, rollers between the inertia member and one of the other members, and a spring connecting the inertia member to the disc member, said rollers being disposed in slots formed in the inertia member and hub member for positively limiting their rotary movement relatively, said rollers contacting with both members to provide a metallic bearing contact between them.

2. A vibration damper comprising a driven hub member, an inertia member rotatably mounted on and in concentric relation to the hub member, means including movable bearing members between the hub member and the inertia member for limiting their relative rotary movement, a lubricant in the space between the hub member and inertia member, and means for sealing the space against escape of lubricant.

3. A vibration damper comprising a driven member, an inertia member rotatably mounted on the driven member, a disc member extending outwardly along the inertia member and then axially over the outer periphery of the latter, spring means extending axially between the inertia member and the side of the disc member and connecting them to resiliently limit rotary movement of the inertia member relative to the driven member, and means positively limiting such resilient relative rotary movement, said last mentioned means comprising rollers between the bearing surfaces of the inertia and driven members, and disposed in openings between the bearing surfaces which are of such dimensions, that rotary movement of the members relatively is positively limited.

4. A vibration damper comprising a driven hub member, an inertia member rotatably mounted on and in concentric relation to the hub member, a disc secured to the hub member and housing the inertia member, and a spring connection between the inertia member and the disc, said spring connection comprising a spring leaf connected to one of the members and projecting at its free end and in an axial direction, into an opening in the other.

5. A vibration damper comprising a driven hub member, an inertia member rotatably mounted on and in concentric relation to the hub member, a disc secured to the hub member and housing the inertia member, and a spring connection between the inertia member and the disc, said spring connection comprising a spring leaf connected to one of the members and projecting axially into an opening in the other, and yielding means between the leaf and the sides of the opening in such other member.

ARCHIBALD A. WARNER.